US 11,761,376 B1

(12) United States Patent
Vinski et al.

(10) Patent No.: US 11,761,376 B1
(45) Date of Patent: Sep. 19, 2023

(54) SIDE PLATE FOR ROTARY ENGINE

(71) Applicant: PRATT & WHITNEY CANADA CORP., Longueuil (CA)

(72) Inventors: Johnny Vinski, Chateauguay (CA); Vincent Savaria, Laval (CA); David Gagnon-Martin, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/054,701

(22) Filed: Nov. 11, 2022

(51) Int. Cl.
*F02B 55/08* (2006.01)
*F16J 9/12* (2006.01)

(52) U.S. Cl.
CPC ............... *F02B 55/08* (2013.01); *F16J 9/12* (2013.01)

(58) Field of Classification Search
CPC ...... F02B 55/08; F02B 2053/05; F02B 55/14; F16J 9/12; F01C 21/108; F01C 21/10; F04C 2240/30; F04B 39/121; F04B 53/16
USPC ............. 123/18 A, 18 R, 43 A, 45 A, 45 R, 123/200–249; 418/140, 187, 61.1
See application file for complete search history.

(56) References Cited

U.S. PATENT DOCUMENTS

| 4,741,308 A | 5/1988 | Ballinger |
| 9,896,934 B2 * | 2/2018 | Villeneuve .............. F02B 55/14 |
| 10,302,016 B2 | 5/2019 | Durand et al. |
| 11,333,068 B1 * | 5/2022 | Savaria ..................... F01C 1/22 |
| 11,613,995 B2 * | 3/2023 | Gagnon-Martin ........ F01C 1/22 123/200 |
| 2017/0175620 A1 * | 6/2017 | Villeneuve .............. F01C 21/06 |
| 2017/0184016 A1 * | 6/2017 | Yu ........................... F02B 53/04 |
| 2020/0200009 A1 * | 6/2020 | Gagnon-Martin ........ F01C 1/22 |

FOREIGN PATENT DOCUMENTS

WO    2015004357    1/2015

* cited by examiner

*Primary Examiner* — J. Todd Newton
(74) *Attorney, Agent, or Firm* — NORTON ROSE FULBRIGHT CANADA LLP

(57) ABSTRACT

A side housing for a rotary internal combustion engine, has: a side wall; a side plate having a rotor-engaging side facing away from the side wall and a back side opposite the rotor-engaging side and facing the side wall, the side plate defining first threads located on the back side, the first threads extending circumferentially around a central axis of the side plate; and a nut rotatable relative to the side wall about the central axis of the side plate and axially locked to the side wall relative to the central axis, the side plate secured to the side wall via a threaded engagement between the first threads of the side plate and second threads defined by the nut.

20 Claims, 12 Drawing Sheets

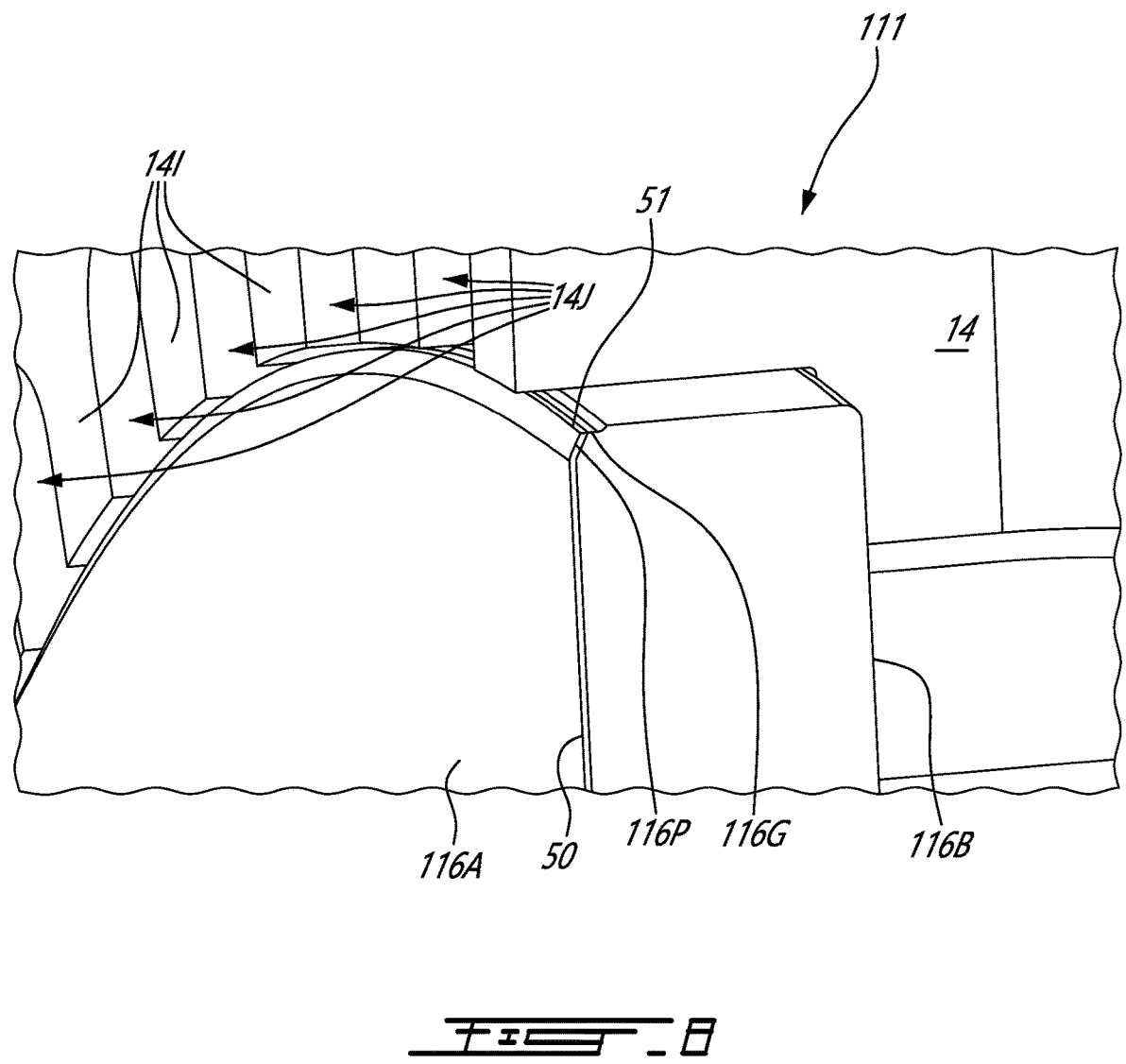

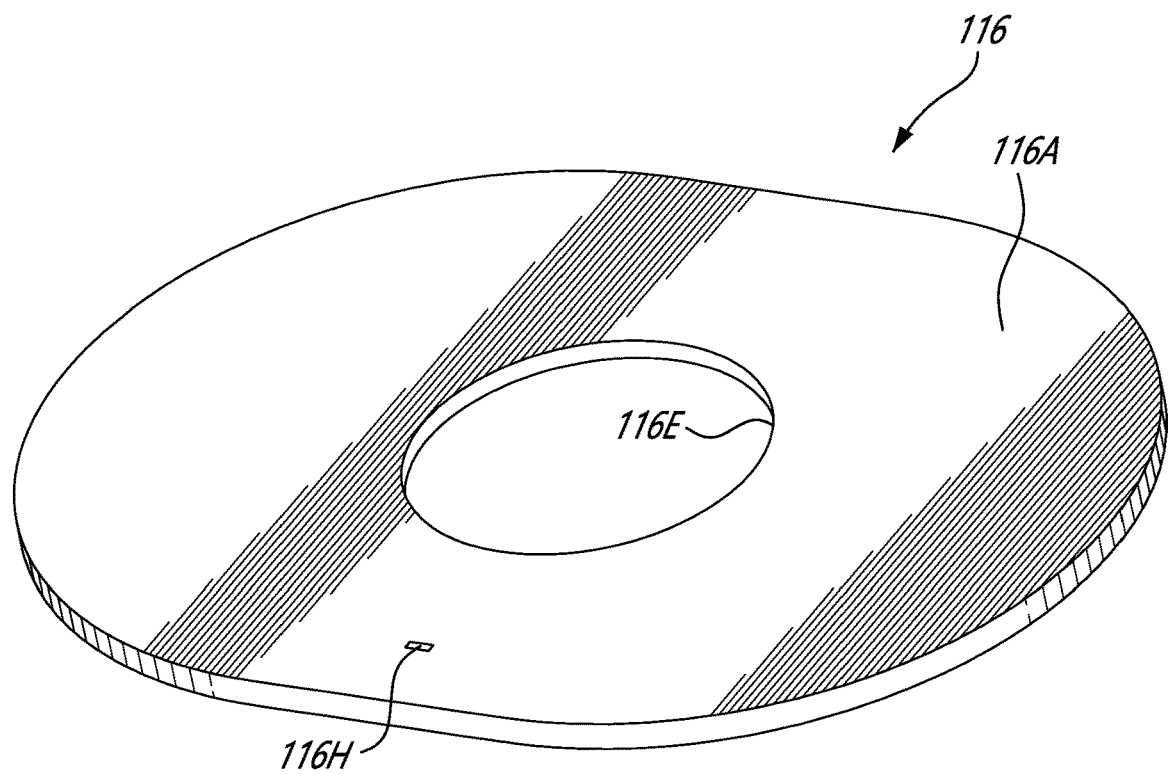
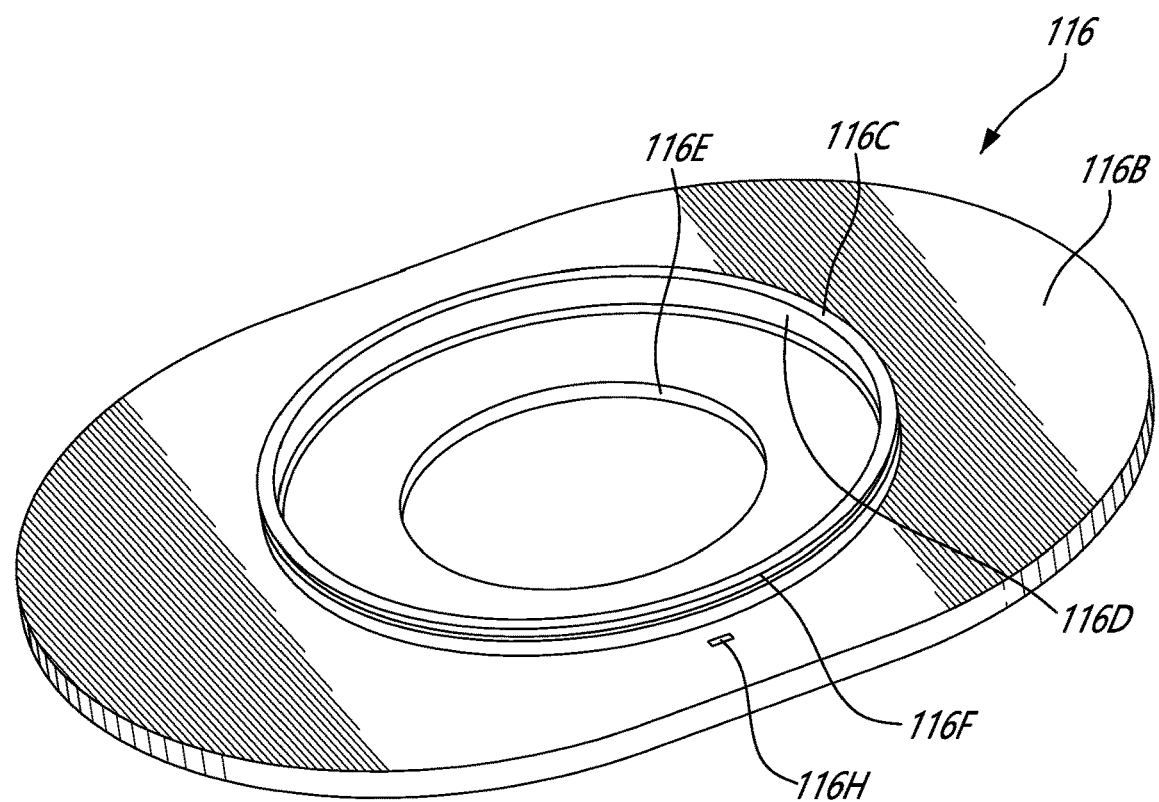

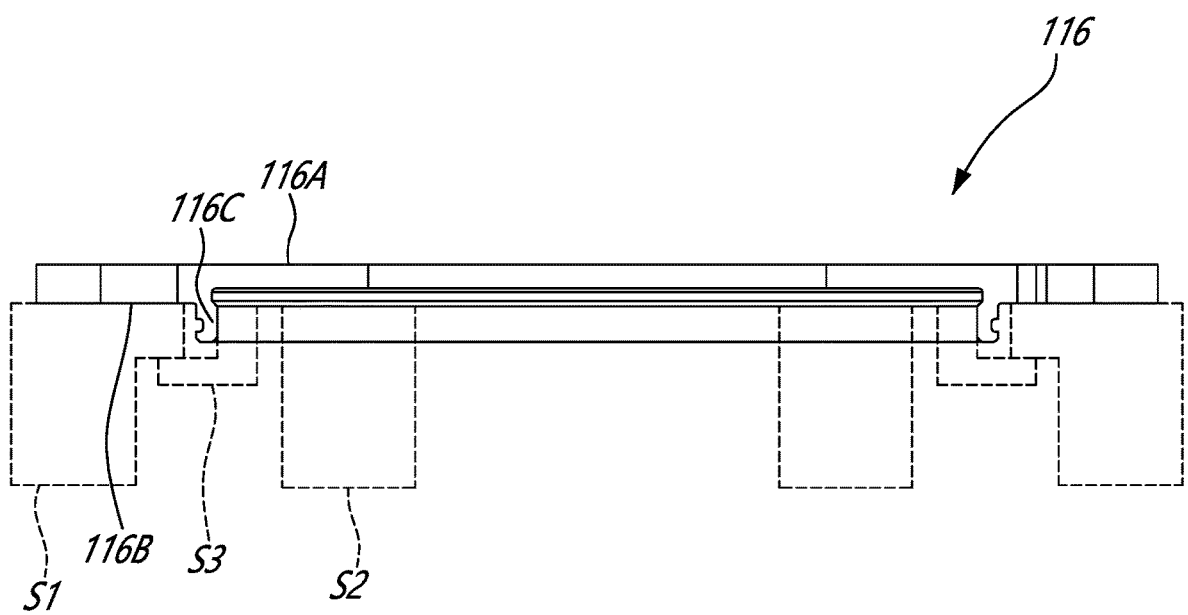

SIDE PLATE FOR ROTARY ENGINE

TECHNICAL FIELD

The application relates generally to internal combustion engines and, more particularly, to rotary internal combustion engines.

BACKGROUND OF THE ART

Combustion chambers of a rotary engine, such as a Wankel engine, are delimited radially by the rotor and rotor housing and axially by the two end walls. The end walls facing the combustion chamber are subjected to high pressure and thermal loads. On the other hand, the end walls must provide the running surface for the rotor's side seals.

SUMMARY

In one aspect, there is provided a side housing for a rotary internal combustion engine, comprising: a side wall; a side plate having a rotor-engaging side facing away from the side wall and a back side opposite the rotor-engaging side and facing the side wall, the side plate defining first threads located on the back side, the first threads extending circumferentially around a central axis of the side plate; and a nut rotatable relative to the side wall about the central axis of the side plate and axially locked to the side wall relative to the central axis, the side plate secured to the side wall via a threaded engagement between the first threads of the side plate and second threads defined by the nut.

The side housing may include any of the following features, in any combinations.

In some embodiments, the first threads are defined by a protrusion extending from a back face of the side plate.

In some embodiments, the protrusion is monolithic with a remainder of the side plate.

In some embodiments, the side wall defines a bore bounded by a bore peripheral face, an annular recess extending radially outwardly from the bore peripheral face relative to the central axis, a retaining member received within the annular recess.

In some embodiments, the nut has a peripheral flange, the peripheral flange being in axial abutment against the retaining member.

In some embodiments, the retaining member includes annular ring segments circumferentially distributed about the central axis and received within the annular recess.

In some embodiments, the nut has a web extending radially inwardly to a radially-inner edge, lugs protruding inwardly from the radially-inner edge, the lugs engageable by a tool for rotating the nut about the central axis.

In some embodiments, the web is free of contact with the back side of the side plate.

In some embodiments, the side plate is made of aluminum, the rotor-engaging side being coated with a hard coating.

In some embodiments, the side plate extends radially from a central hole sized for receiving a shaft of the rotary engine to a peripheral edge, the first threads located radially between the peripheral edge and the central hole.

In another aspect, there is provided a rotary internal combustion engine comprising: a rotor; a housing circumscribing a rotor cavity, the rotor received within the rotor cavity and rotatable within the rotor cavity relative to the housing, the housing having a peripheral wall extending circumferentially about a central axis, side housings mounted to the peripheral wall, the rotor cavity extending axially between the side housings, a side housing of the side housings having: a side wall secured to the peripheral wall, a side plate having a rotor-engaging face facing the rotor cavity and in contact with the rotor, and a back face opposite the rotor-engaging face and facing the side wall, and a protrusion extending from the back face, the side plate secured to the side wall via the protrusion, the protrusion located radially inwardly of the peripheral wall, the protrusion extending circumferentially about the central axis.

The rotary internal combustion engine may include any of the following features, in any combinations.

In some embodiments, a nut is axially locked to the side wall and rotatable relative to the side wall about the central axis, the protrusion threadingly engaged to the nut.

In some embodiments, the nut is axially locked to the side wall via a retaining member.

In some embodiments, the side wall defines a bore bounded by a bore peripheral face, an annular recess extending radially outwardly from the bore peripheral face relative to the central axis, the retaining member received within the annular recess.

In some embodiments, the nut has a peripheral flange, the peripheral flange being in axial abutment against the retaining member.

In some embodiments, the retaining member includes annular ring segments circumferentially distributed about the central axis and received within the annular recess.

In some embodiments, the nut has a web extending radially inwardly to a radially-inner edge, lugs protruding inwardly from the radially-inner edge, the lugs engageable by a tool for rotating the nut about the central axis.

In some embodiments, the web is free of contact with the back face of the side plate.

In some embodiments, the side plate has a peripheral section extending circumferentially around the central axis, the peripheral section disposed axially between the side wall and the peripheral wall, an axial gap between the peripheral wall and the rotor-engaging face of the side plate at the peripheral section.

In some embodiments, the protrusion and the side plate are two parts of a single monolithic body.

DESCRIPTION OF THE DRAWINGS

Reference is now made to the accompanying figures in which:

FIG. 8 is a three-dimensional cutaway view of a portion of a side housing in accordance with one embodiment;

FIG. 9 is a three dimensional view illustrating a rotor-engaging face of a side plate for the side housing of FIG. 8;

FIG. 10 is a three dimensional view illustrating a back face of the side plate of FIG. 9;

FIG. 16 is a cutaway view of the side plate of FIG. 9 illustrating a support for holding the side plate during a grinding process.

DETAILED DESCRIPTION

Figure 1:
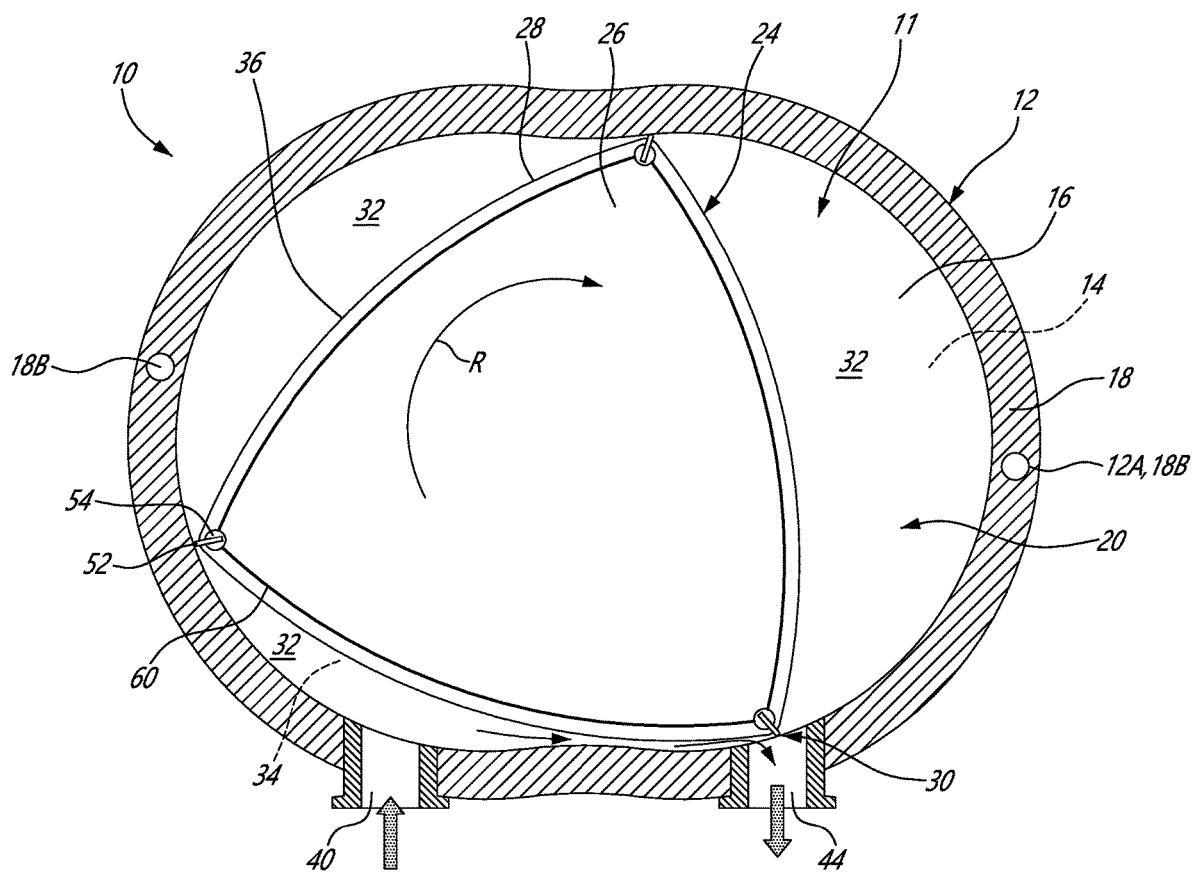
FIG. 1 is a schematic cross-sectional view of a rotary internal combustion engine in accordance with one embodiment.

Referring to FIG. 1, a rotary internal combustion engine, referred to simply as a rotary engine 10 below, which may be a Wankel engine, is schematically shown. The rotary engine 10 comprises an outer body 12 having axially-spaced side housings 11, which each includes a side wall 14 and a side plate 16 mounted to the side wall 14, with a peripheral wall 18 extending from one of the side housings 11 to the other, to form a rotor cavity 20. In FIG. 1, the side wall 14 is indicated with a dashed line because it sits below the side plate 16. The inner surface of the peripheral wall 18 of the cavity 20 has a profile defining two lobes, which may be an epitrochoid.

The outer body 12 includes a coolant circuitry 12A, which may include a plurality of coolant conduits 18B defined within the peripheral wall 18. As shown more clearly in FIG. 5, the coolant conduits 18B extends from one of the side housings 11 to the other. The coolant circuitry 12A is used for circulating a coolant, such as water or any suitable coolant, to cool the outer body 12 during operation of the rotary engine 10. Although only two coolant conduits 18B are shown, it is understood that more than two coolant conduits 18B may be used without departing from the scope of the present disclosure.

An inner body or rotor 24 is received within the rotor cavity 20. The rotor 24 has axially spaced end faces 26 adjacent to the side walls 14, and a peripheral face 28 extending therebetween. The peripheral face 28 defines three circumferentially-spaced apex portions 30, and a generally triangular profile with outwardly arched sides 36. The apex portions 30 are in sealing engagement with the inner surface of peripheral wall 18 to form three rotating combustion chambers 32 between the rotor 24 and outer body 12. The geometrical axis of the rotor 24 is offset from and parallel to the axis of the outer body 12.

The combustion chambers 32 are sealed. In the embodiment shown, each rotor apex portion 30 has an apex seal 52 extending from one end face 26 to the other and biased radially outwardly against the peripheral wall 18. An end seal 54 engages each end of each apex seal 52 and is biased against the respective side wall 14. Each end face 26 of the rotor 24 has at least one arc-shaped face seal 60 running from each apex portion 30 to each adjacent apex portion 30, adjacent to but inwardly of the rotor periphery throughout its length, in sealing engagement with the end seal 54 adjacent each end thereof and biased into sealing engagement with the adjacent side plates 16 of the side housings 11. Alternate sealing arrangements are also possible.

Although not shown in the Figures, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric to impede leakage flow of lubricating oil radially outwardly thereof between the respective rotor end face 26 and side housings 11. During each rotation of the rotor 24, each chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air and an exhaust port 44 In the embodiment shown, the ports 40, 44 are defined in the peripheral wall 18. Alternate configurations are possible.

In a particular embodiment, fuel such as kerosene (jet fuel) or other suitable fuel is delivered into the chamber 32 through a fuel port (not shown) such that the chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Referring now to FIGS. 2-5, one of two side housings 11 of the outer body 12 is illustrated. As briefly introduced above, the side housings 11 include the side walls 14 that are secured to the peripheral wall 18. Each of the side walls 14 has a portion located proximate an outer perimeter P (FIG. 4) of the side wall 14 and configured to be in abutment against the peripheral wall 18 for defining the rotor cavity 20.

In the embodiment shown, each of the side walls 14 is configured to be secured to a respective one of opposed ends of the peripheral wall 18. The side housings 11 further include side plates 16 located on inner sides of the side walls 14. The side plates 16 define rotor-engaging faces 16A on which the side seals 60 and the corner seals 54 of the rotor 24 are in abutment during rotation of the rotor 24. The side plates 16 further define back faces opposite the rotor-engaging faces 16A. The back faces of the side plates 16 face the side walls 14.

The side walls 14 may be made of aluminum, more specifically an aluminum alloy, due to its light weight and high thermal conductivity. However, it may be required that the surfaces of the side walls 14 in contact with the seals 54, 60 be coated to provide a wear-resistance surface. In the embodiment shown, the side plates 16 are made of aluminum and coated with a hard material such as silicon carbide, aluminum nitride, chromium carbide, tungsten carbide, and so on. Any suitable wear resistant coating applied by thermal spray or any other suitable method may be used. The side walls 14 and the side plates 16 will be described in more details below. Although the text below uses the singular form, the description may be applied to both of the side walls 14 and to both of the side plates 16.

Figure 4:
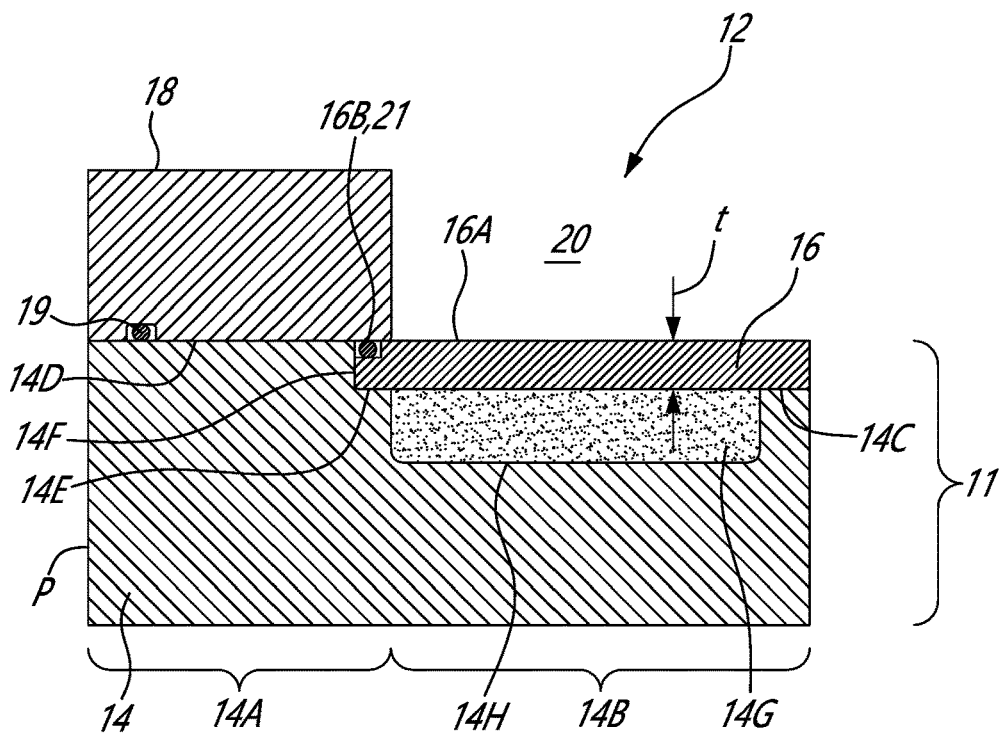
FIG. 4 is a schematic cross-sectional view taken along line B-B of FIG. 2 in accordance with one embodiment.

Referring more particularly to FIG. 4, the side wall 14 includes a peripheral section 14A, which is in abutment with the peripheral wall 18, and a center section 14B, which is circumferentially surrounded by the peripheral section 14A. In the disclosed embodiment, the peripheral section 14A of the side wall 14 is secured to the peripheral wall 18. The center section 14B of one of the side walls 14 faces the center section 14B of the other of the side walls 14. The side walls 14 are secured to the peripheral wall 18 with any suitable means known in the art. As shown, a sealing member 19 is located between the peripheral wall 18 and the peripheral sections 14A of the side walls 14 for limiting coolant from leaking out. The sealing member 19 may be a O-ring. The sealing member 19 may be received within an annular recess, which may be defined by one or more of the peripheral wall 18 and the side wall 14.

The side wall 14 defines a recess 14C for receiving the side plate 16. The peripheral section 14A of the side wall 14 extends from the outer perimeter P to the recess 14C. As shown, a surface 14D of the peripheral section 14A of the side wall 14 that faces the peripheral wall 18 is axially offset from a surface 14E of the center section 14B of the side wall 14. A magnitude of the offset corresponds to a depth of the recess 14C and may correspond to a thickness t of the side plate 16 plus any axial gap defined between a rotor-engaging face of the side plate 16 and the peripheral wall 18. The side plate 16 is therefore in abutment with the surface 14E of the center section 14B of the side wall 14. In other words, a sealing surface of the side plate 16, located on a side of the side plate 16 that faces the rotor cavity, may be aligned with the peripheral section 14A of the side wall 14.

The side wall 14 defines an abutment surface 14F. The abutment surface 14F is defined by a shoulder created by the offset of the surfaces 14D, 14E of the peripheral and central sections 14A, 14B of the side wall 14. The side wall 14, via its abutment surface 14F, limits radial movements of the side plate 16 relative to the axis of rotation of the rotor 24.

In a particular embodiment, a gap may remain between a peripheral section of the side plate 16 and the abutment surface 14F of the side wall 14. In other words, and in the embodiment shown, the side plate 16 may be spaced apart from the abutment surface 14F. A size of the gap may change during operation of the rotary engine 10 as the side wall 14 and the side plate 16 may expand at different rates with an increase of a temperature in the rotor cavity 20. In other words, the space between the side plate 16 and the abutment surface 14F of the side wall 14 may allow relative thermal expansion between the side plate 16 and the side wall 14 so that thermal stress transferred from the side plate 16 to the peripheral wall 18 and the side wall 14 might be minimized.

To limit axial movements of the side plate 16 relative to the axis of rotation of the rotor 24 (FIG. 1), a periphery of the side plate 16 is contained axially between the peripheral wall 18 and the side wall 14. In other words, the periphery of the side plate 16 is sandwiched between the side wall 14 and the peripheral wall 18. A sealing member 21 is located at the periphery of the side plate 16 for limiting the combustion gases to leak out of the rotor cavity 20 and for limiting the cooling fluid from leaking into the combustion chamber 32 (FIG. 1). As shown more specifically in FIGS. 4-5, the sealing member 21 is contained within a recess 16B defined by the side plate 16. The sealing member 21 may be a O-ring. Any suitable sealing member may be used.

In a particular embodiment, the sealing member 21 and the abutment surface 14F of the side wall 14 allows the side plate 16 to move radially relative to the side wall. Such a movement, along a radial direction relative to the axis of rotation of the rotor 24, may be required in a configuration in which the side wall 14 is made of a material having a coefficient of thermal expansion different than that of the side plate 16 and/or because the different components may be exposed to different temperatures and, thus may exhibit different thermal expansions.

The side wall 14 further defines a pocket 14G that may circumferentially extend a full circumference of the side wall 14. In other words, the pocket 14G is annular. More than one pocket may be used. The pocket 14G may not cover an entirety of the center section 14B of the side wall 14. The pocket 14G is configured for circulating a liquid coolant, such as water for cooling the side plate 16. The pocket 14G may be part of the coolant circuitry 12A and is in fluid flow communication with the coolant conduits 18B that are defined in the peripheral wall 18. The pocket 14G extends from the surface 14E of the center section 14B and away from the rotor cavity 20. A depth D (FIG. 5) of the pocket 14G is defined by a distance along the axis of rotation of the rotor 24 between the surface 14E of the center section 14B and a bottom surface 14H of the pocket 14G.

Figure 2:
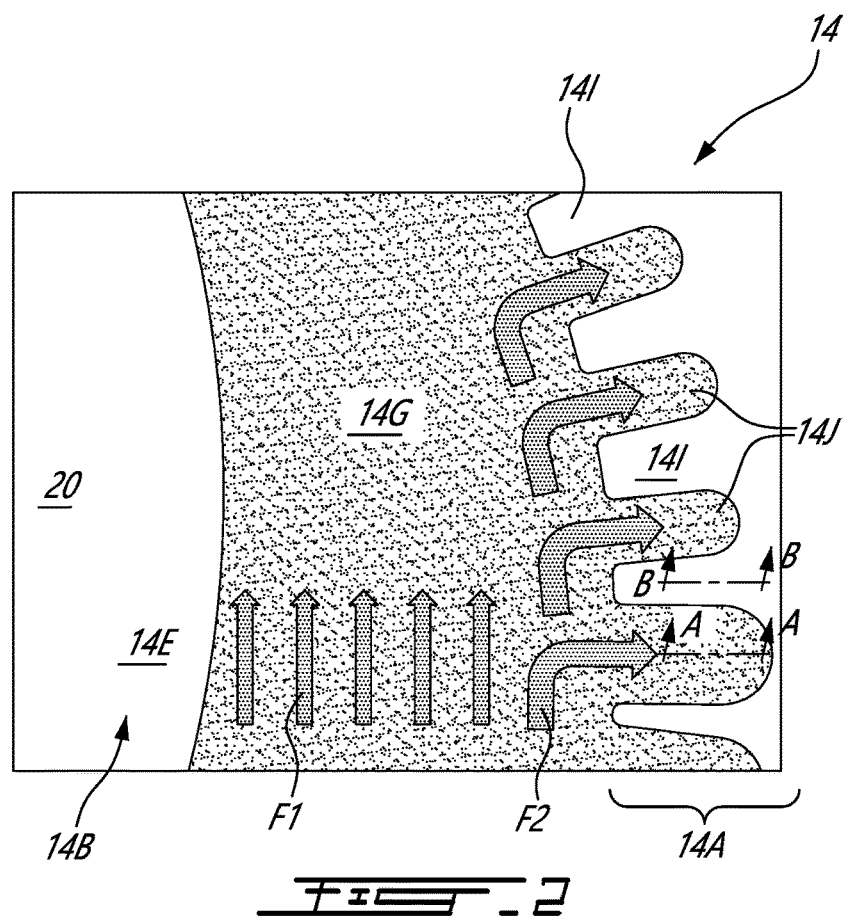
FIG. 2 is a schematic fragmented top view of a side wall of a housing of the rotary internal combustion engine of FIG. 1.
Figure 3:
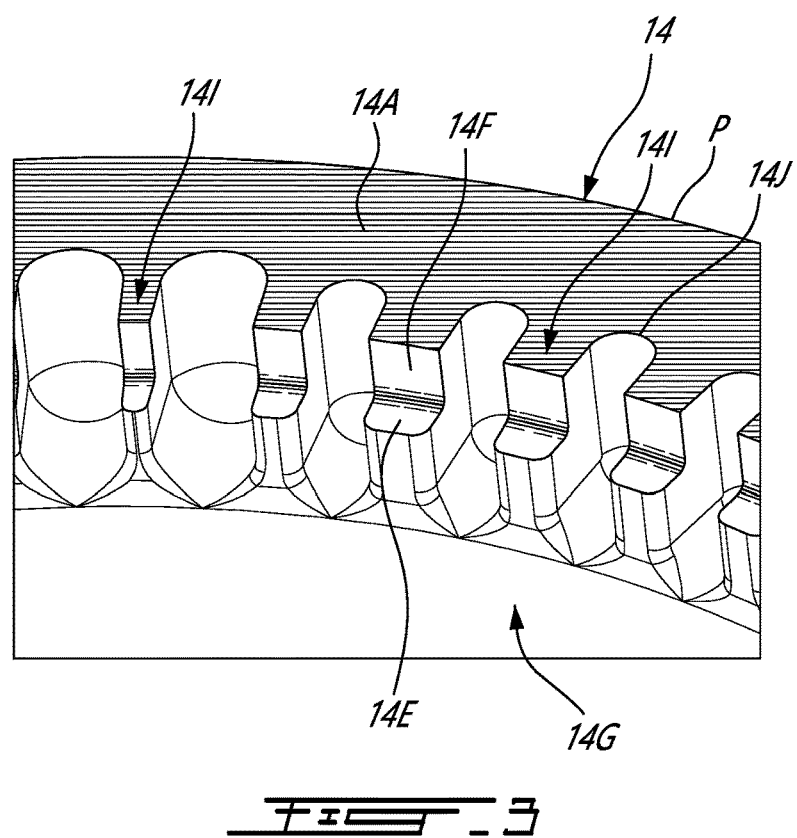
FIG. 3 is a schematic fragmented three-dimensional view of the side wall of FIG. 2.

As shown in FIGS. 2-3, the peripheral section 14A of the side wall 14 defines a plurality of ribs 141 that are circumferentially distributed around the rotor cavity. The ribs 141 defines the abutment surface 14F and a portion of the surface 14E of the center section 14B of the side wall 14. Consequently, and in the depicted embodiment, the abutment surface 14F is defined by a plurality of surfaces defined by the ribs 141. The ribs 141 may be configured to support a pressure load imparted by a combustion of a mixture of air and fuel within the combustion chambers 32.

Cavities or spaces 14J are defined between the ribs 141. More specifically, each pair of two consecutive ones of the ribs 141 defines a space 14J therebetween. The spaces 14J are in fluid communication with the pocket 14G and with the coolant conduits 18B of the peripheral wall 18. Stated otherwise, the coolant conduits 18B are in fluid communication with the pocket 14G via the spaces 14J between the ribs 141. The spaces 14J may allow the liquid coolant to flow from the pocket 14G to the coolant conduits 18B of the peripheral wall 18. It is understood that the liquid coolant may be circulated in closed loop and through a heat exchanger. The heat exchanger may be used to dissipate heat to an environment outside the engine; the heat transferred from the engine to the liquid coolant.

Figure 5:
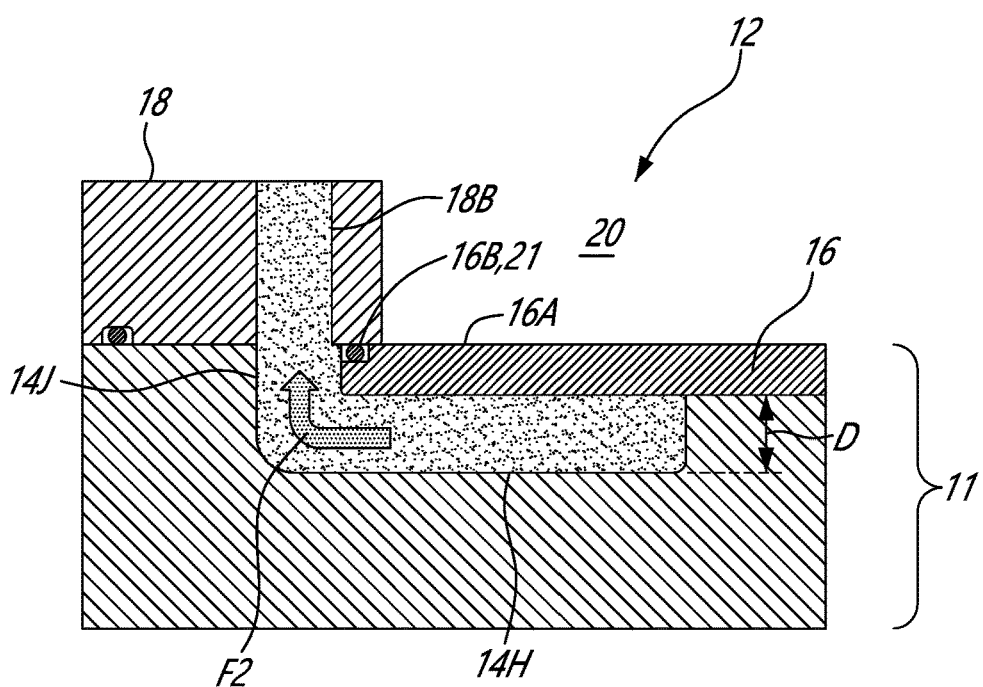
FIG. 5 is a schematic cross-sectional view taken along line A-A of FIG. 2 in accordance with the embodiment of FIG. 4.

As shown in FIGS. 2 and 5, a flow F1 of the liquid coolant circulates within the pocket 14G. The flow F1 is divided in sub-flows F2; each of the sub-flows F2 circulating within a respective one of the spaces 14J and within a respective one of the coolant conduits 18B of the coolant circuitry 12A. The liquid coolant may be circulated out of the outer body 12 and within a heat exchanger for extracting the heat. The liquid coolant may then be reinjected in the coolant circuitry 12A for further heat extraction.

Figure 6:
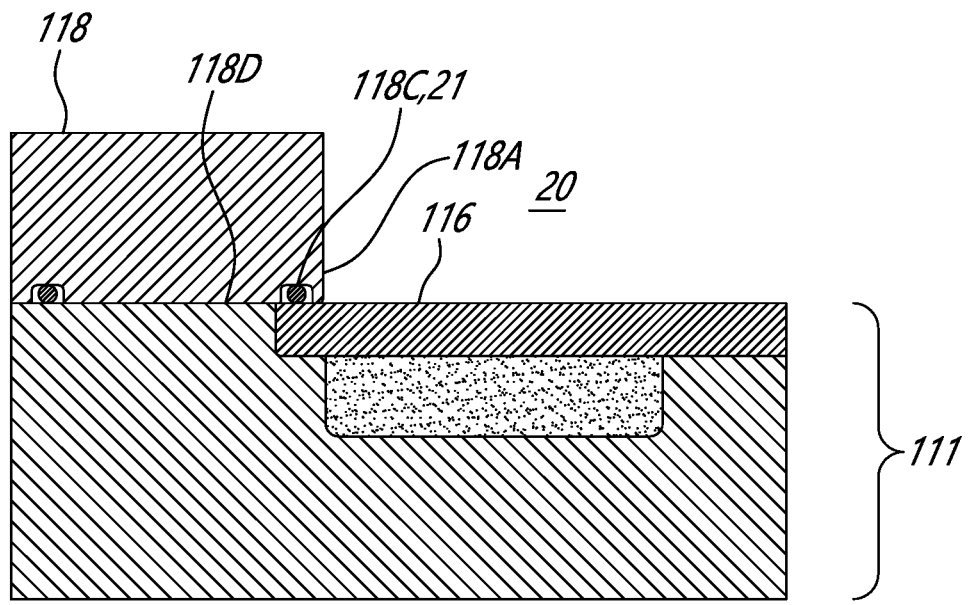
FIG. 6 is a schematic cross-sectional view taken along line B-B of FIG. 2 in accordance with another embodiment.
Figure 7:
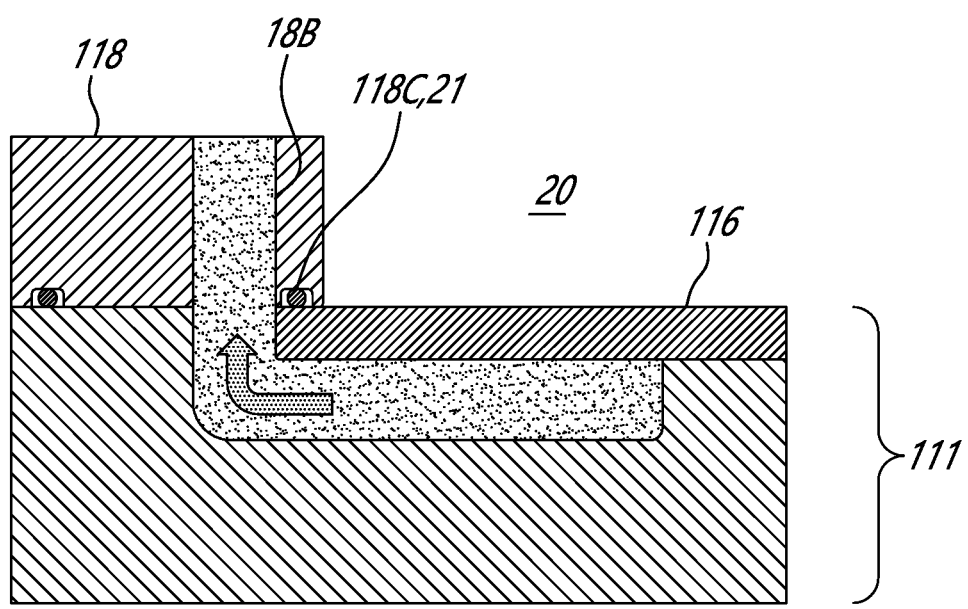
FIG. 7 is a schematic cross-sectional view taken along line A-A of FIG. 2 in accordance with the embodiment of FIG. 6.

Referring now to FIGS. 6-7, another embodiment of the outer body is generally shown. For the sake of conciseness, only elements that differ from the outer body 12 of FIGS. 2-5 are described. In the embodiment shown, the recess 118C that receives the sealing member 21 is defined by the peripheral wall 118 instead of by the side plate 116.

Referring to FIG. 8, as mentioned above, the side plate 116 may be made of aluminum and is coated with a hard material such as silicon carbide or another suitable material such as chromium carbide. The coating of the side plate 116 defines the rotor-engaging face 116A on a rotor-engaging side of the side plate 116. The coating may be applied with plasma spray, high velocity oxygen fuel (HVOF), or any other suitable coating technique. The rotor-engaging face 116A may be enhanced by other techniques such as electro deposited plating (e.g., nanocrystalline CoP, Nickasil) and conversion coatings (e.g., silicon saturation). In the embodiment shown, the side plate 116 has a flared portion 116P that flares away from an end face 118D (FIG. 6) of the peripheral wall 118. The flared portion 116P extends away from a plane containing a remainder of the side plate 116. The flared portion 116P extends toward the side wall 14. The flared portion 116P is shown as being a chamfer, but may alternatively be a roundover or any other suitable shape. A first coating 50 is deposited on the side plate 116. The first coating 50 extends up to a coating edge 51. The coating edge 51 is located on the flared portion 116P. Therefore, a gap or spacing is provided between the coating edge 51 and the end face 118D of the peripheral wall 118 such that the coating edge 51 is distanced from the end face 118D of the peripheral wall 118 by the spacing. The coating edge 51 is therefore free of contact with the end face 118D of the peripheral wall 118. The first coating 50 may have a substantially uniform thickness up to the coating edge 51. Or, in the alternative, the first coating 50 may tapers down toward the coating edge 51. It may tapers down to zero in thickness. In other words, the thickness of the first coating 50 may decrease toward the coating edge 51. The thickness may decrease below its nominal thickness where it covers the flared portion 116P. The first coating 50 therefore follows the shape of the flared portion 116P.

The flared portion 116P may have a first edge and a second edge located outwardly of the first edge relative to the rotation axis of the rotor 24. The first edge is located inwardly of an inner face 118A (FIG. 6) of the peripheral wall 118. The first edge is thus overlapped by the end face 118D of the peripheral wall 118. The first edge is located between the inner face 118A of the peripheral wall 118 and an outer face of the peripheral wall 118; the outer face facing away from the rotor cavity 20. Therefore, a start location of the flared portion 116P, which corresponds to the first edge, is aligned with, or is overlapped by, the peripheral wall 118 and may be offset from a coating deposited on the inner face 118A of the peripheral wall 118. Thus, the first coating 50, located on the flared portion 116P, may be free of contact with the coating 70 of the peripheral wall 118. More detail about this coating arrangement is provided in U.S. Pat. No. 11,333,068, the entire contents of which are incorporated herein by reference.

In the embodiment shown, the coating edge 51 ends at a peripheral groove 116G. A radial gap is therefore present between the side plate 116 and the abutment surface 14F of the side wall 14 at the peripheral groove 116G. The side plate outer edge geometry may alternatively include only of a simple chamfer or radius.

In some cases, the side plate may be in intimate contact with the peripheral face. Thus, when the engine stack is clamped during assembly some preload may be transferred to the coating surface. During engine operation additional loads may be imposed to the side plate and relative slip between the mating parts may occur. After some engine running time, the coating edge area on the side plate may be progressively worn by the coating on the peripheral wall. This may initiate coating cracks and eventually coating edge spalling on the side plate. Moreover, a relatively high internal oil consumption may be exhibited due to difficulty of controlling deformations of the side plate during operation. The side plate may be fixed on the side housing with several small bolts pulling near the central portion and potentially creating local depressions on the final coated surface located on the other side of the side plate, and therefore further increasing the oil consumption because of the difficulty of the rotor side sealing grid to follow this locally deformed surface closely enough to avoid oil leaks. Also, the side plate is put in sandwich between the side wall and the peripheral wall. This creates two highly loaded axial interfaces on both sides of the side plate and may present potential areas of concern for surface fretting damage. Also, on the engine level, introducing several components in the axial stack increases the variability in positioning the bearing centers. The part geometry may be complicated at least part due to cooling passages that may be machined in the side plate to allow coolant to flow from the side wall to the peripheral wall. Fitting all these features on the side plate may limit the available design space and drives thin wall thickness at many locations. These locations may become stress risers and become potential weaker point for the part resistance to fatigue damage.

Figure 11:
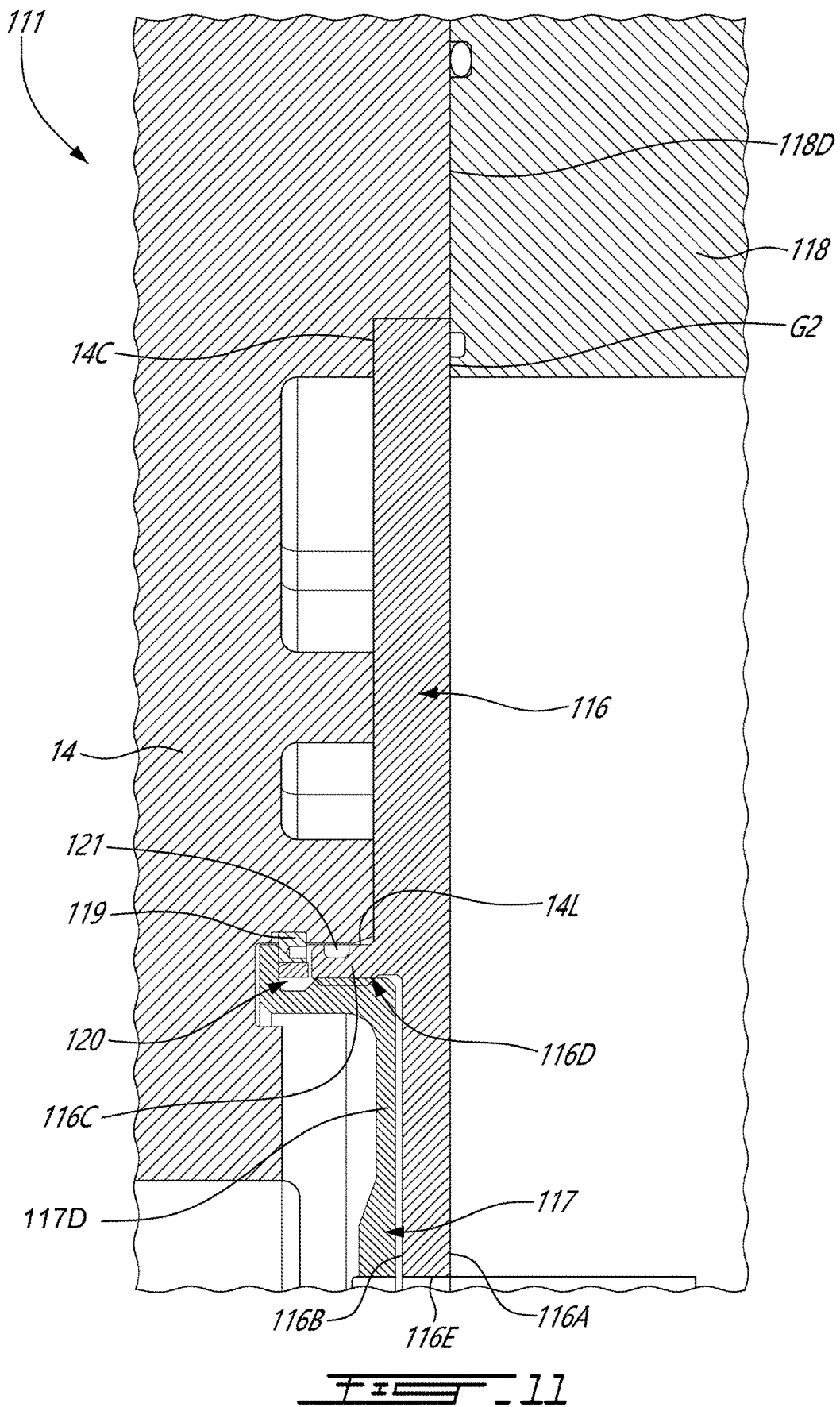
FIG. 11 is a cross-sectional view of the side housing of FIG. 8.

Referring now to FIG. 9-11, features of the side plate 116 of the present disclosure may at least partially alleviate these drawbacks. The side plate 116 has a rotor-engaging side that defines a rotor-engaging face 116A facing the rotor cavity 20 and in contact with the rotor 24, and a back side that defines a back face 116B opposed to the rotor-engaging face 116A. The back face 116B faces away from the rotor cavity 20 and away from the rotor 24. The back face 116B faces the side wall 14 and may be in contact with the side wall 14. The back side of the side plate 116 defines threads. In the embodiment shown, these threads are defined by a protrusion 116C, which may also be referred to as a threaded member, that extends from the back face 116B and that extends away from the back face 116B and away from the rotor-engaging face 116A. In the present embodiment, and as will be explained later, the side plate 116 is secured to the side wall 14 via the protrusion 116C. The side plate 116 is non-rotatable relative to the side wall 14. The protrusion 116C and the side plate 116 may be two parts of a single monolithic body. In other words, the protrusion 116C may monolithically protrude from the back face 116B.

Any suitable means for securing the side plate 116 to the side wall 14 is contemplated. For instance, the protrusion 116C may define one of dog(s) and slot(s) whereas the side wall 14 may define the other of dog(s) and slot(s). The dog(s) engageable to the slot(s) to axially lock the side plate 116 to the side wall 14. The protrusion 116C is herein shown as being annular and extending circumferentially a full circumference. It will be appreciated that the protrusion 116C may include a plurality or protrusion sections circumferentially distributed about the rotation axis and spaced apart from one another. The protrusion 116C may be removable from the side plate 116.

Figure 12:
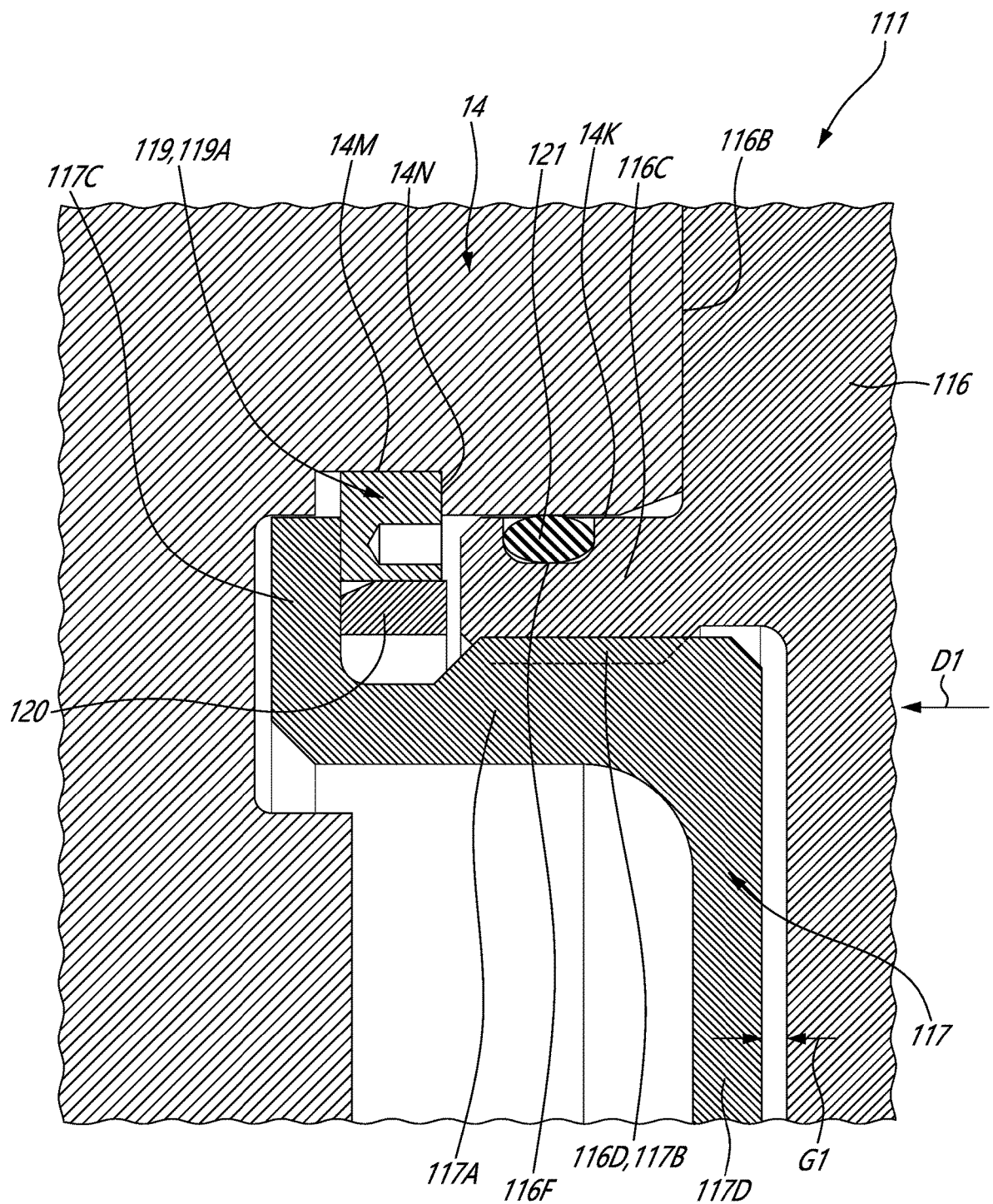
FIG. 12 is an enlarged view of a portion of FIG. 11.

Referring to FIGS. 11-12, the protrusion 116C defines first threads 116D, which are herein located on a face of the protrusion 116C that faces a radially-inward direction. Herein, the first threads 116D are located on an outer face of the protrusion 116C, but other configurations are contemplated. The protrusion 116C is circular and extends circumferentially a full circumference around an axis of the rotary engine 10. This axis may correspond to a rotation axis of the rotor 24. In an alternate embodiment, the protrusion 116C may include a plurality of protrusion segments circumferentially distributed about the axis. The segments may be spaced apart from one another and each may define threads. The side plate 116 defines a central hole 116E. The central hole 116E is circumscribed by the protrusion 116C. The protrusion 116C defines an annular groove 116F (FIG. 12) sized for receiving a sealing member 121 (FIG. 12), such as an O-ring. The sealing member 121 is biased radially between the protrusion 116C within the annular groove 116F and a bore peripheral face 14K (FIG. 12) that circumscribes a bore 14L (FIG. 11) of the side wall 14. The sealing member 121 may be alternatively an axial or corner O-ring.

Figure 13:
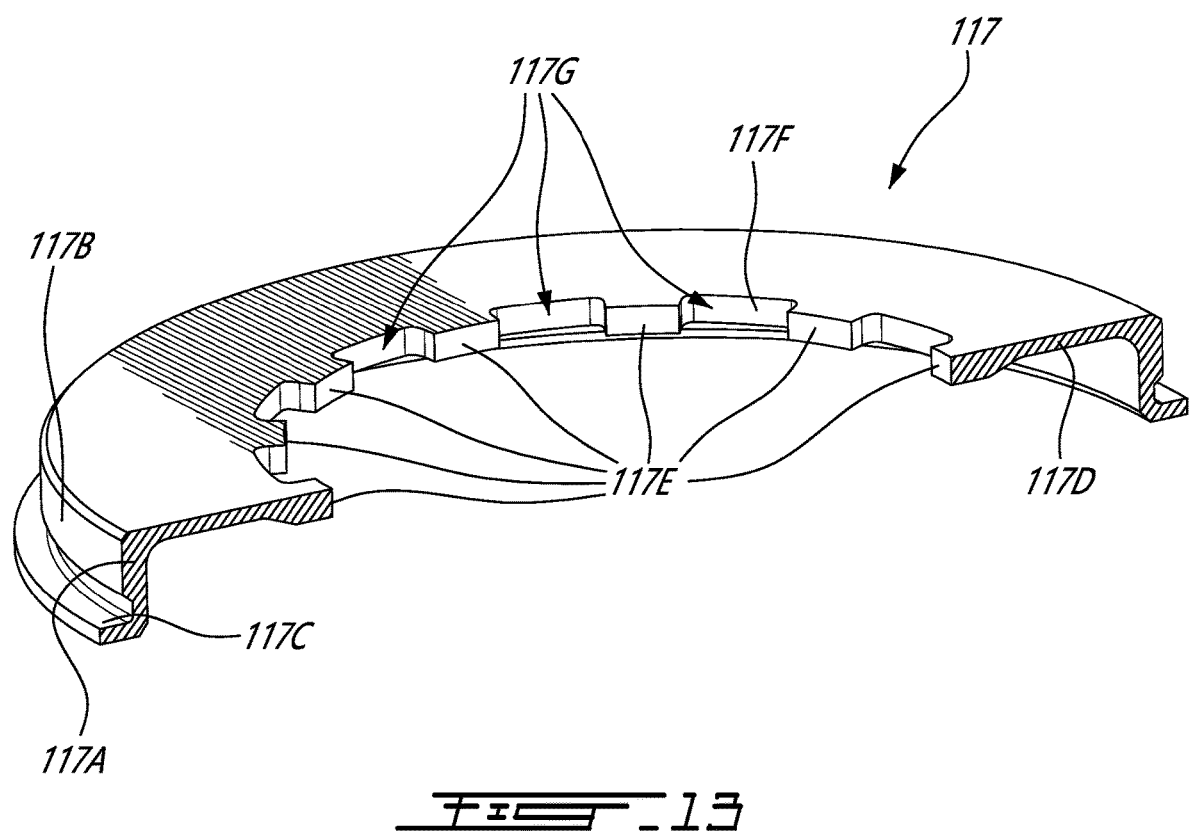
FIG. 13 is a three dimensional cutaway view of a nut to be used with the side plate of FIG. 9.

Referring to FIGS. 12-13, the side housing 11 further includes a nut 117 that is used for securing the side plate 116 to the side wall 14. The nut 117 includes a central section 117A that defines second threads 117B and that extends axially relative to the axis of rotation of the rotor 24, a flange 117C that extends radially outwardly from a first axial end of the central section 117A, and a web 117D that extends radially inwardly from a second opposite axial end of the central section 117A. In the embodiment shown, the second threads 117B are located on a face of the central section 117A that faces a radially-outward direction. When viewed in cross-section, the nut 117 has a Z-shape. The second threads 117B of the nut 117 are threadingly engageable to the first threads 116D of the protrusion 116C of the side plate 116. The nut 117 may be made of aluminum or any other suitable material. The second threads 117B may be UNJ type threads or any other suitable threads. Pockets may be introduced in the web 117D of the nut 117 for weight reduction and to allow oil to contact the back face 116B of the side plate 116 to contribute in providing an even temperature distribution along the side plate 116. Thread locking features such as, but not limited to, Spiralock (e.g., self-locking) thread pattern, plastic insert or a pin system may be incorporated for the nut.

Referring more particularly to FIG. 12, the nut 117 is axially locked to the side wall 14 and is rotatable relative to the side wall 14 about its central axis. The second threads 117B of the nut 117 are threadingly engageable to the first threads 116D of the protrusion 116C of the side plate 116. Therefore, rotation of the nut 117 about its central axis translates in an axial movement of the side plate 116 along direction D1 and relative to the side wall 14 until the side plate 116 is seated in the recess 14C defined by the side all 14.

As shown in FIG. 12, the nut 117 is axially locked to the side wall 14 via a retaining member 119. The retaining member 119 is received within an annular recess 14M that extends radially outwardly from the bore peripheral face 14K. Therefore, the retaining member 119 is blocked axially relative to the side wall 14 by being partially received within the annular recess 14M. The flange 117C of the nut 117 is disposed axially rearward of the retaining member 119. In other words, the flange 117C and the retaining member 119 radially overlap one another; the retaining member 119 being located axially between the flange 117C and the side plate 116. Axial movements of the nut 117 are therefore blocked by the flange 117C axially abutting against the retaining member 119, which is itself blocked axially by a shoulder 14N that bounds the annular recess 14M; the shoulder 14N facing an axial direction relative to the axis.

In the embodiment shown, the retaining member 119 includes a plurality of ring segments 119A circumferentially distributed about the central axis of the side plate 116. Each of the ring segments 119A may be inserted axially into the bore 14L of the side wall 14 until it becomes axially aligned with the annular recess 14M. Then, the ring segments 119A may be moved radially outwardly until they are inside the annular recess 14M and at least partially radially overlapping the shoulder 14N. A shim 120 may then be inserted until it axially overlaps the ring segments 119A. The shim 120 may have a frustoconical shape to help pushing the ring segments 119A within the annular recess 14M. The shim 120 may be fully circumferential and may be used to maintain the ring segments 119A properly seated within the annular recess 14M. Holes or slots may be machined in the ring segments 119A to ease manipulation. A number of the ring segments 119A may be determined to ease assembly while providing the adequate retention of the nut 117. A thickness of the flange 117C is carefully designed to fit inside the side wall 14 and to allow enough deflection under load to keep a proper contact pattern height and to avoid or limit edge contact with the annular ring segments.

As shown in FIG. 12, once the side plate 116 is secured to the side wall 14, a first gap G1 remains between the web 117D of the nut 117 and the back face 116B of the side plate 116. The first gap G1 extends axially between the web 117D of the nut 117 and the side plate 116. The web 117D is therefore free of contact with the back face 116B of the side plate 116. A recess may be machined in the side plate 116 and/or in the web 117D to avoid contact between the side plate 116 and the nut 117. Moreover, as shown in FIG. 11, a peripheral section of the side plate 116 is sandwiched between the side wall 14 and the peripheral wall 118. A second axial gap G2 is disposed between the peripheral wall 118 and the rotor-engaging face 116A of the side plate 116. Thus, the rotor-engaging face 116A of the side plate 116 may be free of contact with the peripheral wall 118. This may limit potential damage that could be imparted to the coating of the side plate by the internal edge of the rotor housing 118.

In the embodiment shown, the first threads 116D defined by the protrusion 116C are centered relative to the side plate 116. The first threads 116D may extend annularly a full circumference around a central axis of the side plate 116. The first threads 116D may be located radially between the central hole 116E used for receiving a shaft of the rotary engine 10 and a peripheral edge of the side plate 116. Thus, in the present embodiment, the side plate 116 is secured to the side wall 14 via a retaining force exerted on the side plate 116 via the protrusion 116C and the nut 117. The retaining force may be substantially uniformly distributed around a central axis of the side plate 116. The retaining force may be centered relative to the side plate 116. This may allow to achieve a uniform retaining force that may allow to overcome the afore-mentioned drawbacks (e.g., local depression in the side plate impairing sealing).

Referring now to FIG. 13, the nut 117 is shown in greater detail. The nut 117 further includes lugs 117E protruding inwardly from a radially-inner edge 117F of the web 117D. The lugs 117E are engageable by a tool for rotating the nut 117 about its central axis. Slots 117G are interspaced between the lugs 117E. In an alternate embodiments, the lugs 117E may be replaced by teeth or any other suitable means for being engaged by a tool. The radially-inner edge 117F may define a polygonal shape (e.g., hexagonal) able to be engaged by a tool to transmit a torque to the nut 117 for securing the side plate 116 to the side wall 14. The lugs 117E are designed to withstand the assembly tooling torque with sufficient margin while avoiding them to block the oil scavenging flow area. This is why the lugs are radially recessed inwardly from the central hole 116E (FIG. 9) of the side plate 116. In other words, the lugs 117E are recessed radially outwardly from the central hole 116E (FIG. 9) such that the whole area of the central hole 116E is accessible to a flow of oil to reach the back face 116B of the side plate 116. The lugs 117E are located to avoid being intersected by this flow of oil.

The disclosed side plate 116 may allow to transfer axial preload from the nut 117 to the side plate 116 via the first thread 116D machined on the protrusion 116C of the side plate 116. A reaction on the face of the nut 117 is taken by the retaining member 119 engaged in the annular recess 14M of the side wall 14. A diameter of the protrusion 116C is selected to be kept close to the surrounding annular support face on the side wall 14 to minimize the lever arm effect that to minimize bending of the side plate 16. Stated differently, the protrusion 116C via which the side plate 116 is secured to the side wall 14 may be located to be as close as possible to where the side plate 116 abuts the side wall 14 to minimize bending of the side plate 16. This may minimize the side plate bending deformation under preload. The geometry of the ring segments 119A and of the annular recess 14M is chosen to limit their tilting and to minimize contact stress concentration at an edge the side housing groove edge. The ring segments 119A installation may be facilitated by the shim 120.

In the present embodiment, a ratio of a diameter of the protrusion 116C at the first threads 116D to the diameter the sealing member received within the annular groove 116F ranges from 0.92 to 0.97, preferably 0.955. A ratio of the diameter of the protrusion 116C at the first threads 116D to a diameter of the central hole 116E of the side plate 116 ranges from 1.5 to 1.75, preferably 1.68. A ratio of a diameter of the protrusion 116C at the first threads 116D to an internal diameter of the nut 117, that is, at the slots 117G, ranges from 1.5 to 1.89, preferably 1.68. A ratio of a radius of the protrusion 116C at the first threads 116D to a radial distance between the central axis of the side plate 116 and a pressure relieve aperture 116H ranges from 0.83 to 0.92, preferably 0.864. This pressure relieve aperture 116H is fluidly connected to an environment outside the rotary engine 10 and is used to allow combustion gases accumulating between the seals 60 and ring seals located on the end faces 26 (FIG. 1) of the rotor 24. In other words, during operation, some combustion gases may flow past the seals 60 and reach a cavity defined axially between an end face 26 of the rotor 24 and a side plate 116, and radially between the seals 60 and ring seals (not shown) located on the end face 26. To avoid pressure build-up, it may be required to allow the combustion gases to flow out of this cavity. The pressure relieve aperture 116H is used for that purpose and allows the combustion gases to be drained to the environment outside the rotary engine 10.

A ratio of a first thickness of the side plate 116 taken at a location radially outward of the protrusion 116C to a second thickness of the side plate 116 taken at a location radially inward of the protrusion 116C ranges from 1.3 to 1.9, preferably 1.61. A shape of the pressure relieve aperture 116H, which may be referred to as a blow-by hole, may have a height taken in a radial direction of 0.081 inch and a width taken in a circumferential direction of 0.246 inch. A ratio using minimal tolerance to maximal tolerance ranges from 0.32 to 0.34.

To assemble the side housing 11, the nut 117 is inserted first into the bore 14L of the side wall 14. Then, the ring segments 119A are each inserted into the annular recess 14M. The shim 120 may be used to bias the ring segments 119A into the annular recess 14M. This shim 120 may be omitted in some configurations. Then, the side plate 116 may be inserted. To do so, the side plate 116 is moved toward the bore 14L and the first threads 116D of the protrusion 116C are threadingly engaged with the second threads 1178 by rotating the nut 117 about its central axis. This may be done by engaging the lugs 117E of the nut 117. The nut 117 is thus rotated. This translates into a movement of the side plate 116 along the direction D1 until the side plate 116 is properly seated within the side wall 14. In some other embodiments, self-locking thread pattern, plastic insert, or a pin system may be incorporated in the nut 117.

Figure 14:
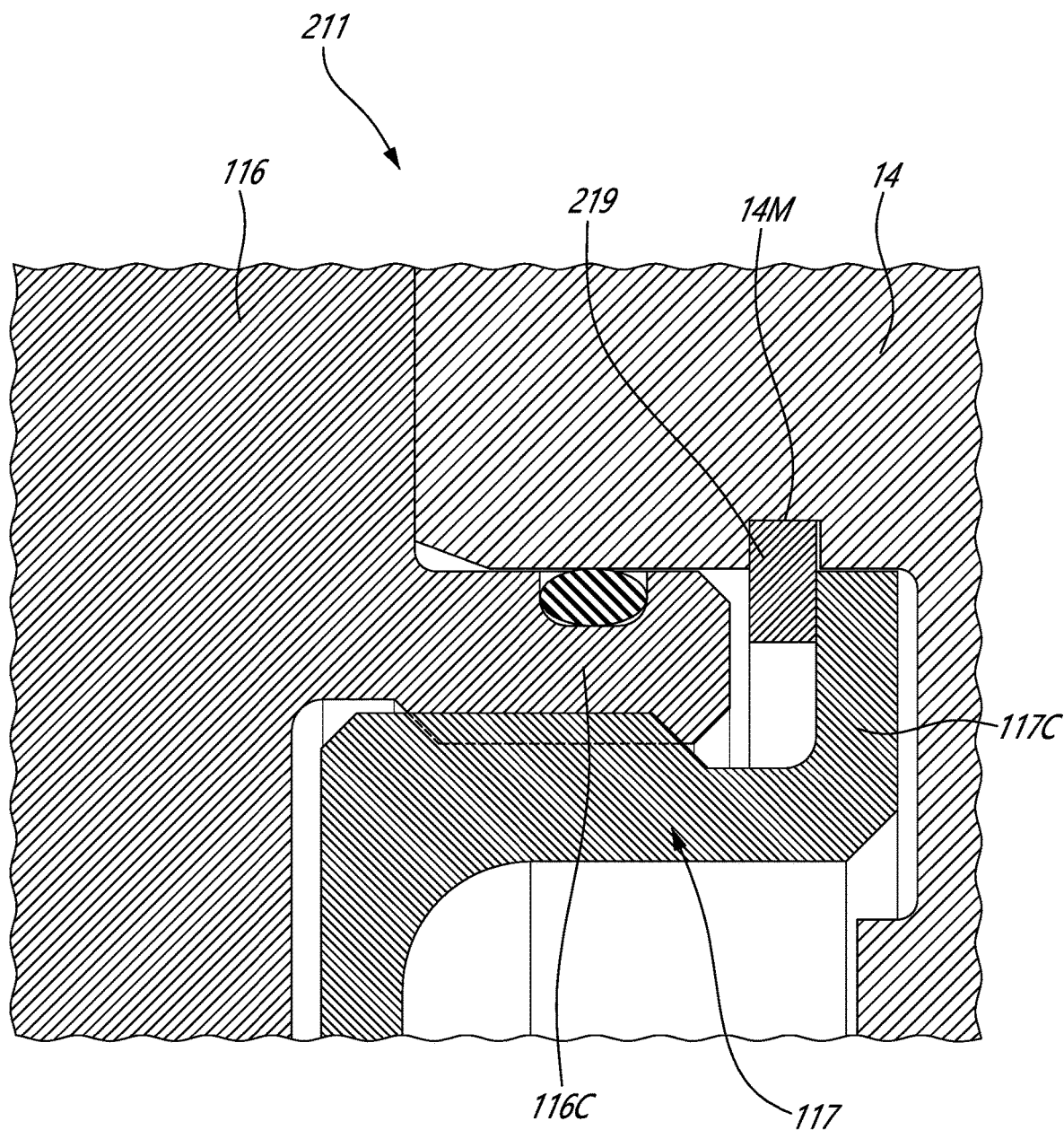
FIG. 14 is a cross-sectional view of a portion of a side housing in accordance with another embodiment.

Referring now to FIG. 14, in accordance with another embodiment a side housing 111, the retaining member 119 may be a retaining ring 219 (e.g., circlip). This retaining ring 219 may be deformed radially and inserted axially until it registers with the annular recess 14M. The retaining ring 219 may then be allowed to expand radially to sit inside the annular recess 14M to thereby axially lock the nut 117 via the flange 117C. Understandably, the nut 117 is inserted first then the retaining ring 219 is installed in the position depicted in FIG. 14. In such a configuration, the shim may be omitted. In some embodiments, two or more retaining rings 219 may be axially stacked upon one another.

Figure 15:
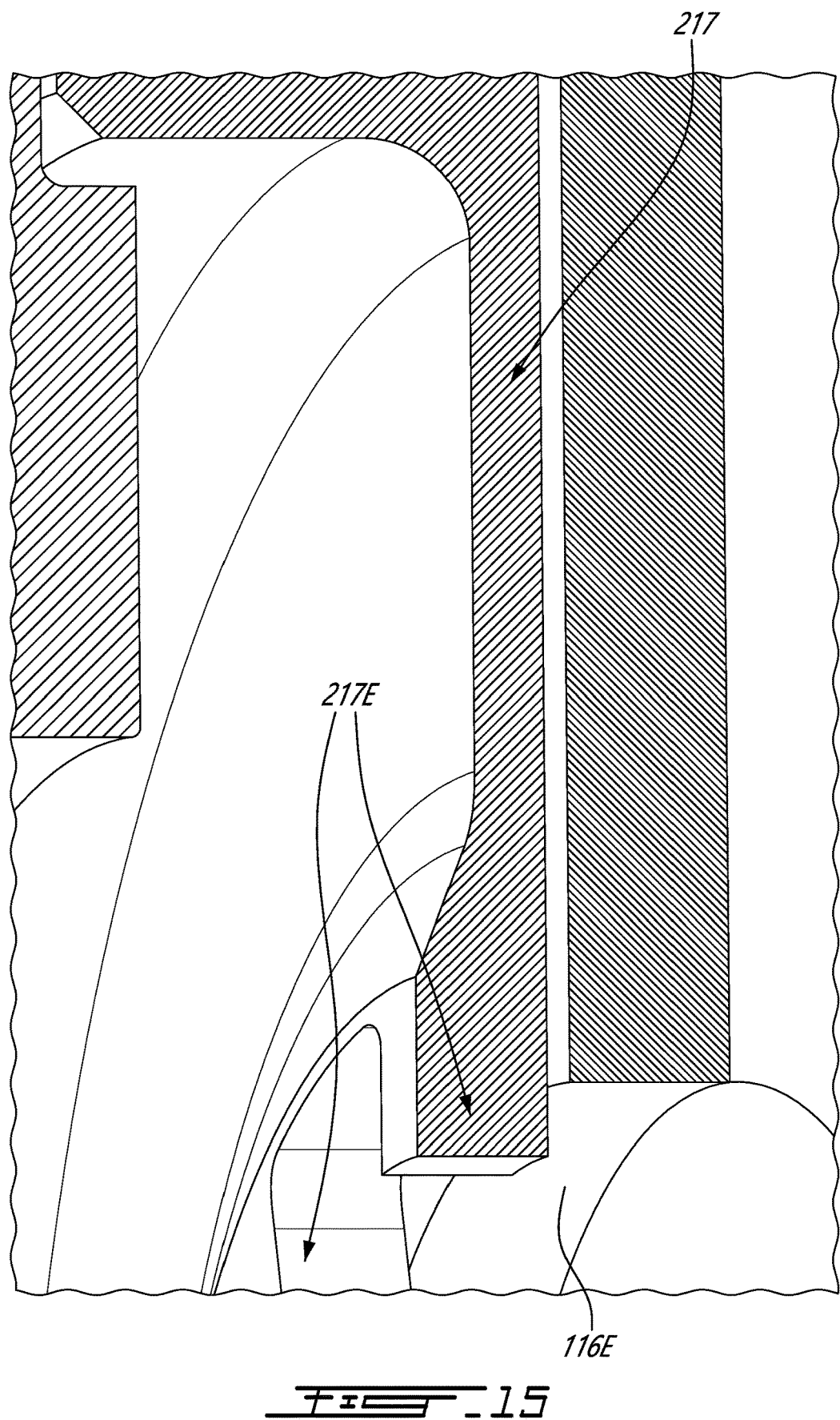
FIG. 15 is a three dimensional cutaway view of a portion of side housing in accordance with another embodiment.

Referring now to FIG. 15, in accordance with another embodiment of a side housing 211, the nut 217 has longer lugs 217E that extends radially inwardly beyond the central hole 116E of the side plate 116. This may allow a tool to have direct access to the nut 217 for rotating the nut 217 to thereby threadingly engage the nut 217 to the protrusion 116C of the side plate 116.

Referring now to FIG. 16, the rotor-engaging face 116A may require to be ground to obtain a suitable surface finish for mating with the rotor seals and have an acceptable wear life. This grinding step may however induce deformation in the side plate 116, which may in turn create areas of non-uniform coating thickness. Thus, deformation of the side plate 116 during the coating process may be managed by carefully designing the clamping fixture of the side plate during a grinding operation. This may allow to obtain a final coating having a substantially uniform thickness.

In the embodiment shown, the side plate 116 may be supported at the back face 1168 both radially inwardly of the protrusion 116C and radially outwardly of the protrusion 116C. To do so, a first support S1 and a second support S2 may be used. The first support S1 may abut the back face 1168 of the side plate 116 at a location radially outward of the protrusion 116C whereas the second support S2 may abut the back face 1168 of the side plate 116 at a location radially inward of the protrusion 116C. The first and second supports S1, S2 may define annular abutting faces that may extend a full circumference. These annular abutting faces may abut the back face 1168 of the side plate 116. The first and second supports S1, S2 may be parts of a single support to allow the machining of the two supporting planes on the same machine and with the same setup. This may maximize the accuracy of their height difference. Stated differently, when designing the grinding fixture that provides the supports S1 and S2 within a single monolithic piece of material, it is possible to finish the two surfaces contacting the back side of the side plate 16 at the same time. These two surfaces are located at two different axial locations (height difference) and are radially offset from one another: one radially inwardly of the protrusion 116C and the other radially outwardly of the protrusion 116C. If the first and second supports S1 and S2 are made of two different parts, they will have to be part of an assembly. This may induce accuracy issues in the height difference of these two surfaces. Ideally, the supports S1 and S2 would contact the back of the side plate 16 simultaneously. In reality, manufacturing errors may cause the side plate back face to contact one of them first.

This technique may ensure a relatively flat (e.g., 0.001-0.002 inch) rotor-engaging face 116A at the grinding stage with minimal clamping load (e.g., few hundred pounds of force). The clamping load at this stage may be minimized since it may result in top surface post-grinding deformations when releasing the clamping load. A support nut S3 may be used to apply the clamping on the first and second supports S1, S2. The second support S2 may define external threads to mate with the threads of the protrusion 116C.

The disclosed side housing 11 including the nut 117 and the side plate 116 may provide a uniform clamping force on the side plate 116. The disclosed side housing 11 may improve rotor sealing, robustness, and durability of the coating. The coated surface of the side plate 116 may remain non-deformed when the engine tie bolts are preloaded to clamp the peripheral wall 118 to the side walls 14 because of the second gap G2 (FIG. 11) defined between the side plate 116 and the peripheral wall 118. It may simplify the design of the outer body 12 of the rotary engine 10, may be easier to machine, to coat, and to grind. The back face 116B of the side plate 116, by being flat, may enhance the possibility to grit blast the side plate 116 on both sides before coating. It may permit control and minimize initial side plate bent shape that may occur when coating a relatively thin plate on one side only. The grit blasting described above may be beneficial to the side plate back face since it may: increase surface roughness to minimize relative slip and surface fretting/wear damage at contacts with the side housing 11. It may enhance heat transfer with coolant, and may reduce compressive residual stresses that may increase the plate surface resistance to fretting and fatigue, etc.

The disclosed design of the side plate 116 may allow quick and easy strip and recoat operations by allowing to remove the coating over the full surface, such as with any basic surface grinder, instead of a precise contouring. This may avoid the need to re-machine the surrounding lip. This may be particularly useful for restoring the side plate surface at engine overhaul. The disclosed design may eliminate the risk of aluminum lip fretting and wear since there is no more lip on the rotor side of the side plate 116. This is possible by sandwiching the peripheral section of the side plate 116 between the peripheral wall 118 and the side wall 14. The proposed design may increase durability of the outer body 12 without compromising engine cooling efficiency. This may be possible by providing the space gained by removing the lip at the outer edge of the side plate 116 with the flared portion 116P (FIG. 8). As discussed above, the flared portion 116P may avoid having the rotor housing edge contacting the peripheral wall 118 too close to the coating edge. This may eliminate the coating edge spalling risk. The disclosed design may ease the initial coating grinding operation by eliminating the protruding coating "ridge" built on the top of the surrounding aluminum lip, which may force additional grinding passes. The grinding operation may produce a smoother and uniform side plate surface that may promote proper rotor side seals contact and may therefore significantly lower the engine internal oil consumption.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A side housing for a rotary internal combustion engine, comprising:
    a side wall;
    a side plate having a rotor-engaging side facing away from the side wall and a back side opposite the rotor-engaging side and facing the side wall, the side plate defining first threads located on the back side, the first threads extending circumferentially around a central axis of the side plate; and
    a nut rotatable relative to the side wall about the central axis of the side plate and axially locked to the side wall relative to the central axis, the side plate secured to the side wall via a threaded engagement between the first threads of the side plate and second threads defined by the nut.

2. The side housing of claim 1, wherein the first threads are defined by a protrusion extending from a back face of the side plate.

3. The side housing of claim 2, wherein the protrusion is monolithic with a remainder of the side plate.

4. The side housing of claim 1, wherein the side wall defines a bore bounded by a bore peripheral face, an annular recess extending radially outwardly from the bore peripheral face relative to the central axis, a retaining member received within the annular recess.

5. The side housing of claim 4, wherein the nut has a peripheral flange, the peripheral flange being in axial abutment against the retaining member.

6. The side housing of claim 5, wherein the retaining member includes annular ring segments circumferentially distributed about the central axis and received within the annular recess.

7. The side housing of claim 1, wherein the nut has a web extending radially inwardly to a radially-inner edge, lugs protruding inwardly from the radially-inner edge, the lugs engageable by a tool for rotating the nut about the central axis.

8. The side housing of claim 7, wherein the web is free of contact with the back side of the side plate.

9. The side housing of claim 1, wherein the side plate is made of aluminum, the rotor-engaging side being coated with a hard coating.

10. The side housing of claim 1, wherein the side plate extends radially from a central hole sized for receiving a shaft of the rotary engine to a peripheral edge, the first threads located radially between the peripheral edge and the central hole.

11. A rotary internal combustion engine comprising:
    a rotor;
    a housing circumscribing a rotor cavity, the rotor received within the rotor cavity and rotatable within the rotor cavity relative to the housing, the housing having a peripheral wall extending circumferentially about a central axis, side housings mounted to the peripheral wall, the rotor cavity extending axially between the side housings, a side housing of the side housings having:
        a side wall secured to the peripheral wall,
        a side plate having a rotor-engaging face facing the rotor cavity and in contact with the rotor, and a back face opposite the rotor-engaging face and facing the side wall, and
        a protrusion extending from the back face, the side plate secured to the side wall via the protrusion, the protrusion located radially inwardly of the peripheral wall, the protrusion extending circumferentially about the central axis.

12. The rotary internal combustion engine of claim 11, comprising a nut axially locked to the side wall and rotatable relative to the side wall about the central axis, the protrusion threadingly engaged to the nut.

13. The rotary internal combustion engine of claim 12, wherein the nut is axially locked to the side wall via a retaining member.

14. The rotary internal combustion engine of claim 13, wherein the side wall defines a bore bounded by a bore peripheral face, an annular recess extending radially outwardly from the bore peripheral face relative to the central axis, the retaining member received within the annular recess.

15. The rotary internal combustion engine of claim 14, wherein the nut has a peripheral flange, the peripheral flange being in axial abutment against the retaining member.

16. The rotary internal combustion engine of claim 14, wherein the retaining member includes annular ring segments circumferentially distributed about the central axis and received within the annular recess.

17. The rotary internal combustion engine of claim 12, wherein the nut has a web extending radially inwardly to a radially-inner edge, lugs protruding inwardly from the radially-inner edge, the lugs engageable by a tool for rotating the nut about the central axis.

18. The rotary internal combustion engine of claim 17, wherein the web is free of contact with the back face of the side plate.

19. The rotary internal combustion engine of claim 11, wherein the side plate has a peripheral section extending circumferentially around the central axis, the peripheral section disposed axially between the side wall and the peripheral wall, an axial gap between the peripheral wall and the rotor-engaging face of the side plate at the peripheral section.

20. The rotary internal combustion engine of claim 11, wherein the protrusion and the side plate are two parts of a single monolithic body.

\* \* \* \* \*